(No Model.) 2 Sheets—Sheet 1.
H. HILL & A. L. ADAMS.
FOLDING PHOTOGRAPHIC CAMERA.
No. 531,416. Patented Dec. 25, 1894.
Fig: 2.
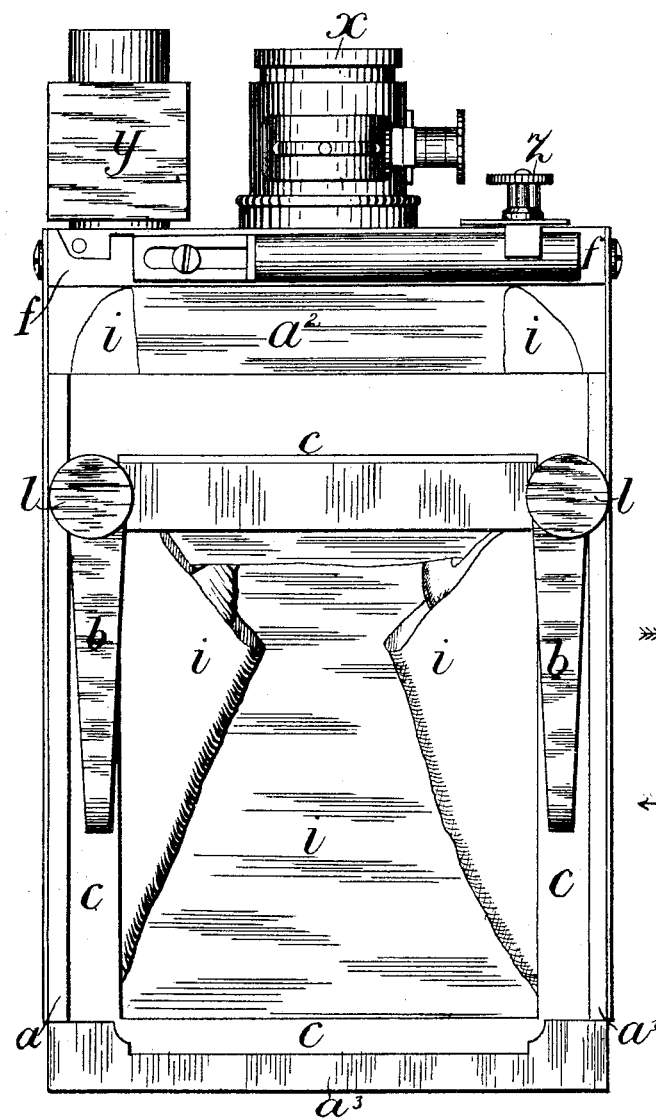
Fig: 1.
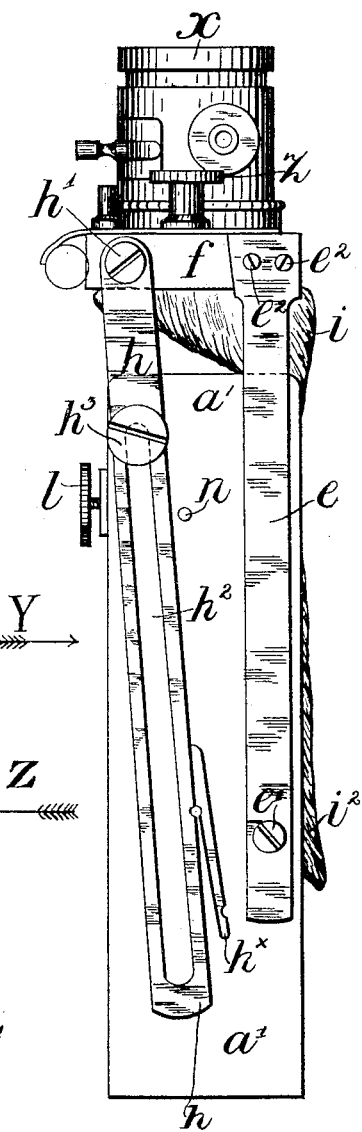
WITNESSES
INVENTORS
Henry Hill and Arthur L. Adams

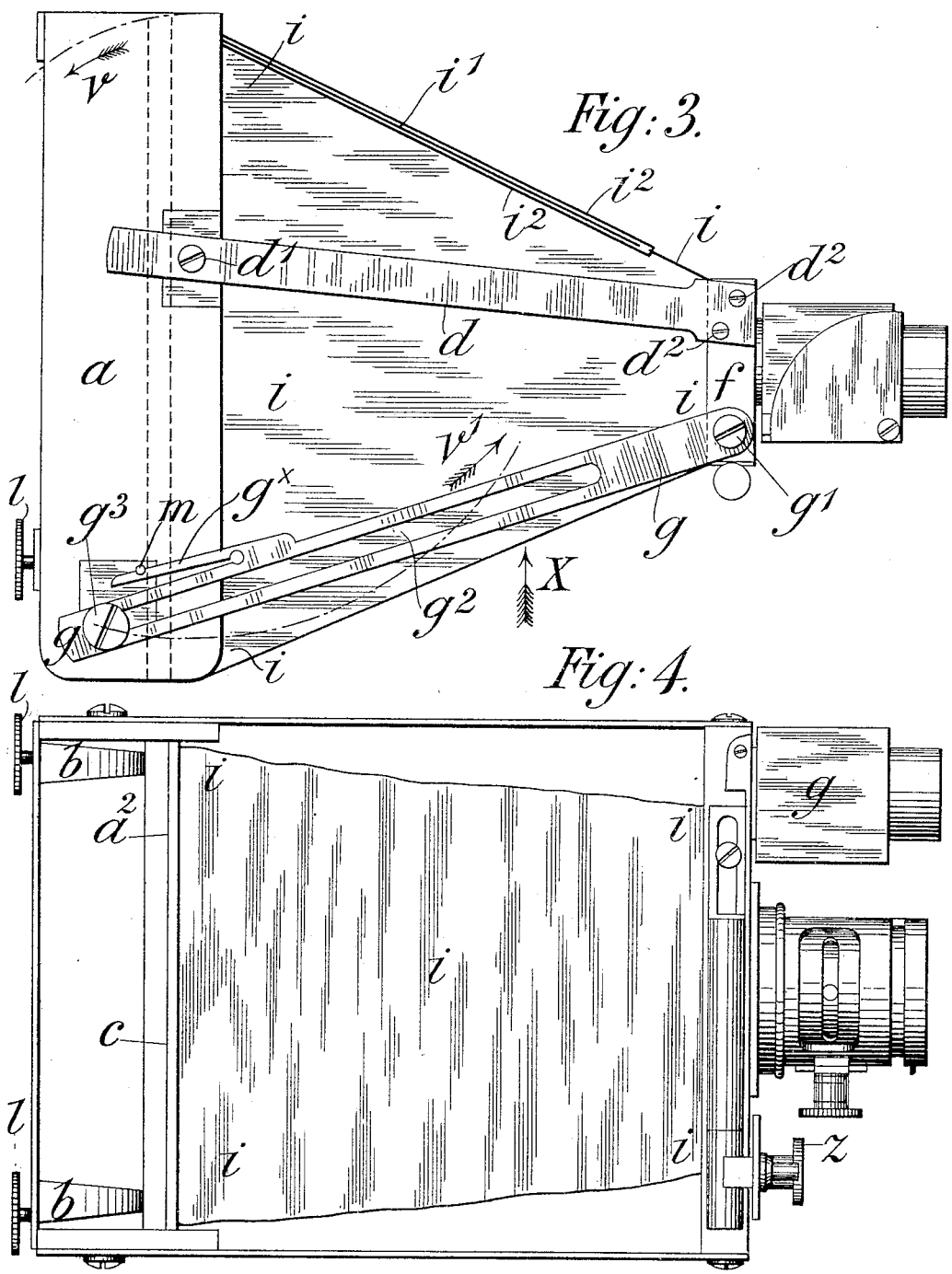

UNITED STATES PATENT OFFICE.

HENRY HILL AND ARTHUR LEWIS ADAMS, OF LONDON, ENGLAND.

FOLDING PHOTOGRAPHIC CAMERA.

SPECIFICATION forming part of Letters Patent No. 531,416, dated December 25, 1894.

Application filed August 4, 1894. Serial No. 519,626. (No model.) Patented in England October 4, 1893, No. 18,595.

*To all whom it may concern:*

Be it known that we, HENRY HILL, of 151 Fentiman Road, Clapham, London, S. W., and ARTHUR LEWIS ADAMS, of 81 Aldersgate Street, London, England, subjects of the Queen of Great Britain, have invented Improvements in Folding Photographic Cameras, (for which we have made application for Letters Patent in Great Britain, No. 18,595, dated October 4, 1893,) of which the following is a specification.

Our invention relates to folding photographic cameras and has for its object to so arrange and construct such camera that it may be set up for working by a single movement and may by a reversal of that movement be folded into a small compass.

In order that our invention may be easily understood and readily carried into practice we will proceed to fully describe same with reference to the drawings hereunto annexed, in which—

Figure 1 is a view of the bottom edge of the camera folded, *i. e.*, looking in the direction of the arrow Z. Fig. 2 is a side view of Fig. 1, *i. e.*, looking in the direction of the arrow Y. Fig. 3 is a plan of the top of the camera unfolded, *i. e.*, a view of the top of the camera when set up ready for use. Fig. 4 is a side view of Fig. 3, *i. e.*, looking in the direction of the arrow X.

Similar letters of reference indicate corresponding parts throughout.

$a$ is top, $a'$ bottom, $a^2$ one side and $a^3$ the other side of the oscillating frame forming the back of the camera, this frame being suitably formed or adapted to receive any suitable dark slide, changing back, reservoir plate or film holder or the like (and also the focusing screen) as ordinarily used in or on photographic cameras, or in any other convenient manner. $b\ b$ are spring arms to keep such dark slide, &c., (and also the removable focusing screen) "up to register" against the rabbet $c\ c$ all round in this frame.

$d$ is a rigid bar, one end of which is pivoted at $d'$ to the top part $a$ of this frame, the other end thereof being rigidly attached at $d^2$ to the top edge of the front or mount $f$. $e$ is a similar rigid bar one end of which is pivoted at $e'$ to the bottom $a'$ of this frame and at its other end is rigidly affixed to $e^2$ to the bottom edge of said mount $f$.

$f$ is front plate or mount carrying the lens $x$, (which is adapted to be moved in and out to focus) view finder $y$ and shutter set by the knob $z$, &c., all of which parts carried on this front or mount $f$ may be of any suitable construction and form no part separately of our present invention.

$g$ is a rigid slotted bar pivoted at $g'$ to the top edge of the front $f$ and having a slot $g^2$ in said bar in which slot the stud or guide pin $g^3$ fixed to $a$ is adapted to travel. $h$ is a similar slotted bar pivoted at $h'$ to the bottom edge of the front $f$ and having a slot $h^2$ in said bar in which a stud $h^3$ fixed to the bottom part $a'$ is adapted to travel.

$i$ is the light tight bellows or flexible material suitably connected to the front plate or mount $f$ all round toward the outer edge thereof and also connected all round to the edge of the back or frame formed by $a\ a'\ a^2\ a^3$ in a light tight manner so as to form a complete light tight chamber between the front plate $f$ and the back frame $a\ a'\ a^2\ a^3$. When the said back part $a\ a'\ a^2\ a^3$ is swung out so as to assume the position shown in Figs. 3 and 4 this bellows or flexible part $i$ will thus form a light tight chamber tapering in shape the sides of which diverge from each other from the front rearwardly, *i. e.*, so as to form a chamber of a size and shape not to interfere with the direct rays of light coming through the lens on to the sensitive surface. It will be obvious that this light tight chamber of tapering form may be arranged and mounted between the front plate $f$ and the back frame $a\ a'\ a^2\ a^3$ in a variety of suitable ways. For instance as shown in Fig. 3 the part of the chamber $i$ lying between the side $a^3$ and the mount $f$ can be formed in two parts telescopically combined so that the tongue $i'$ attached to the side $a^3$ can draw out of the pocket $i^2$ attached to the mount $f$ when the back frame $a\ a'\ a^2\ a^3$ is swung in the direction of the arrows V V' to fold the camera as hereinafter explained while forming a perfectly light tight side to the chamber $i$ when the camera is set up as in Figs. 3 and 4. The side of the chamber opposite to this telescopic part is formed to double up (when the camera is folded) after the manner shown in Fig. 2.

$l\ l$ are set screws or pinching screws to clamp and hold the plate holders or changing box in position on the back of the camera.

The operation is as follows:—When the camera is closed as in Figs. 1 and 2 the slotted arms $g$ and $h$ lie close and parallel or thereabout to the immovable arms $d$ and $e$ respectively the back frame $a\ a'\ a^2\ a^3$ being swung round upon the pivots or centers $d'$ and $e'$ on the immovable arms $d$ and $e$ respectively (in the direction shown by dotted lines in Fig. 3) so as to lie in the position shown in Figs. 1 and 2 and in this folded form the camera is very compact and handy for carrying, &c.

To set the camera up for use the back frame $a\ a'\ a^2\ a^3$ is swung out on the aforesaid centers $d'$ and $e'$ so that such back frame assumes the position shown in Figs. 3 and 4 (at which point the bellows or light tight material assumes the desired form of chamber $i$) and is there held firmly in position by means of the spring arms or catches $g^\times$ and $h^\times$ respectively or any other suitable means engaging with fixed pins or studs $m$ and $n$ mounted in or on the sides $a\ a'$ of the aforesaid frame respectively.

Having thus described our invention, what we claim as new, and desire to secure by Letters Patent of the United States, is—

1. In a photographic camera, the combination of a front plate, backwardly extending arms rigidly pivoted thereto, a swinging frame provided with a guide pin also pivoted to said arms, one end of said frame being adapted to swing outwardly and the other end inwardly when the bellows is to be folded, a bellows connected to said front plate and frame, and a slotted bar connected at one end to said front plate and at its other end to said frame and adapted to work on said guide pin.

2. In a photographic camera, the combination of a front plate, backwardly extending arms rigidly pivoted thereto, a swinging frame provided with a guide pin also pivoted to said arms, one end of said frame being adapted to swing outwardly and the other end inwardly when the bellows is to be folded, a bellows connected to said front plate and frame, a slotted bar connected at one end to said front plate and at its other end to said frame and adapted to work on said guide pin, and means for holding said slotted bar in rigid position when the bellows is open.

3. In a photographic camera, the combination of a front plate, backwardly extending arms rigidly pivoted thereto, a swinging frame provided with a guide pin also pivoted to said arms, one end of said frame being adapted to swing outwardly and the other end inwardly when the bellows is to be folded, a bellows connected to said front plate and frame and adapted to collapse in folds on one side and expand telescopically on the other side and vice versa when folding or unfolding the camera respectively, and a slotted bar connected at one end to said front plate and at its other end to said frame and adapted to work on said guide pin.

HENRY HILL.
ARTHUR LEWIS ADAMS.

Witnesses:
HENRY BIRKBECK,
FRANCIS W. FRIGOUT.